H. D. WEED.
GRIP TREAD FOR TIRES.
APPLICATION FILED SEPT. 3, 1907.
953,673.
Patented Mar. 29, 1910.
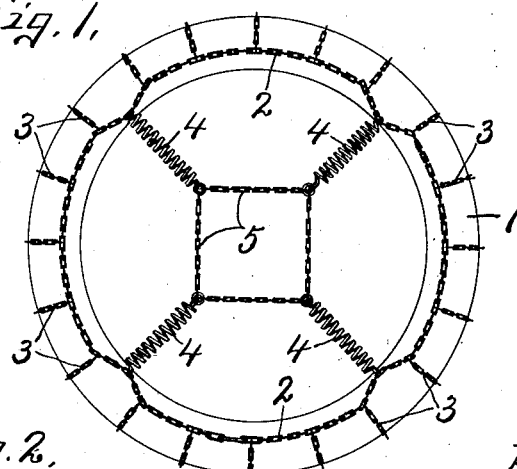
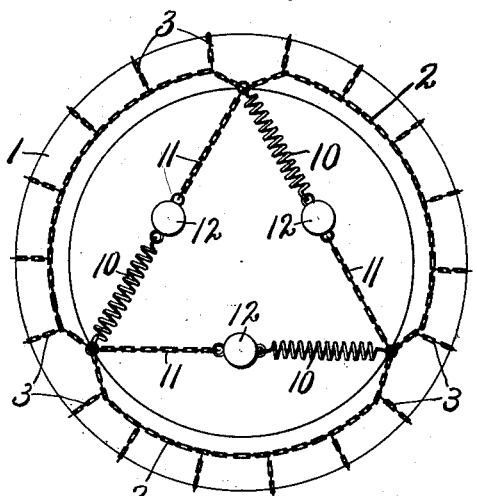
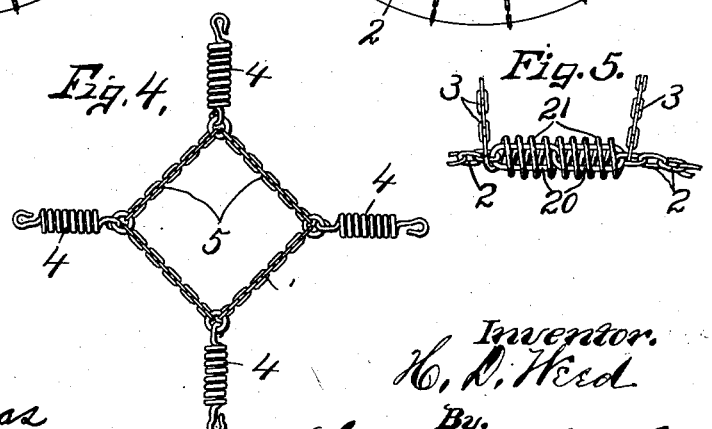
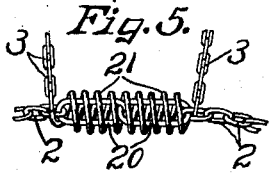
Witnesses.
A. C. Thomas
H. E. Chase
Inventor.
H. D. Weed
By.
Howard P. Denison
Attorney.

UNITED STATES PATENT OFFICE.

HARRY D. WEED, OF SYRACUSE, NEW YORK.

GRIP-TREAD FOR TIRES.

953,673.  Specification of Letters Patent.  Patented Mar. 29, 1910.

Application filed September 3, 1907. Serial No. 391,178.

*To all whom it may concern:*

Be it known that I, HARRY D. WEED, of Syracuse, in the county of Onondaga, in the State of New York, have invented new and useful Improvements in Grip-Treads for Tires, of which the following, taken in connection with the accompanying drawings, is a full, clear, and exact description.

This invention relates to certain improvements in grip treads for tires having gripping elements loosely applied to the periphery of the tire and connected by circular side pieces or other fastening devices whereby the gripping elements may have a free circumferential movement relatively to the tire while in action. It is especially useful, however, in connection with what is commonly known as the "Weed chain tire grip" now in common use. Owing to the fact that these gripping elements are loose, flexible, and free to creep around the tire when in action, there is always more or less centrifugal throw imparted to the cross chains constituting the gripping elements and in time the wear between the several links of both of the cross chains and circular side pieces causes such chains to lengthen more or less so that the centrifugal throw or radial swell of the cross chains causes them to strike the mud guards, the front portions of which are usually in close proximity to the periphery of the traction wheels.

My object, therefore, is to overcome this excessive centrifugal throw by means of an automatic take up device which may constitute a permanent part of the grip tread or made as a separate article of manufacture and readily applied to any grip tread of the class mentioned. In other words I have sought to provide a simple, practical and efficient means for taking up the slack and overcoming excessive centrifugal action of the grip tread without adding materially to the weight or expense of such tread and to still permit the entire device to have free circumferential movement relatively to the tire.

Another specific object is to attach the take up device at regular intervals to the grip tread so as to draw in toward the axis of revolution.

Other objects and uses will be brought out in the following description.

In the drawings—Figures 1, 2 and 3 are elevations of a tire and grip tread thereon showing modified forms of take up devices. Fig. 4 is an elevation of the detached take-up device shown in Fig. 1. Fig. 5 is an elevation of a further modified form of take-up device.

In order to demonstrate the practicability of my invention I have shown in Fig. 1, a tire —1— to which is loosely applied a grip tread composed of opposite circular side pieces —2— and cross pieces or gripping elements —3— having their ends attached to the circular side pieces and their intermediate portions extending across the tread of the tire.

The side pieces —2— preferably consist of parallel chains flexible in all directions and of less length than the circumference of the tire and are usually provided at their ends with interlocking members of any desired construction whereby the grip tread may be applied to or removed from the tire and when thus applied constitute circular side pieces of less diameter than and concentric with the periphery of the tire.

It will be seen from the foregoing description that the grip tread if made up of jointed parts or links in the form of a chain is flexible in all directions and is free to shift or move circumferentially relatively to the tire to obviate any liability of the cross pieces embedding themselves into and thereby unduly wearing any particular portion of said tire and at the same time affording means to remove nails, glass, stones and other sharp instruments which may become embedded in the tire. The specific feature of my invention, however, lies in the means for automatically taking up the slack and preventing undue centrifugal throw of the cross pieces and as shown in Fig. 1, this device consists of a series of in this instance four, radially extending springs —4— having their outer ends provided with hooks which are engaged at regular intervals with one of the side pieces —2— while their inner ends are connected to a suitable anchorage —5—, consisting in this instance, of a flexible ring or chain which when in operative position assumes an angular form and is held in place solely by the spring connections —4— with the circular side pieces —2—.

The springs —4— are preferably of uniform length and tension so that when tensioned and connected to the side pieces —2— at equi-distant points the anchorage —5— will be held centrally with reference to the wheel and at the same time the springs —4— assume a radial position and, therefore, the tension upon the grip tread is radial toward the center of the wheel. This same effect may be produced by many other forms of take up devices, as for instance, in Fig. 2 I have shown one of the circular side pieces —2— as connected by radial chains —6— or rods —7— to a central anchorage composed of springs —8— which are tensioned to draw the chains —6— and portions of the circular side pieces —2— to which they are attached radially toward the axis of the wheel thereby automatically taking up the slack in the grip tread and preventing excessive centrifugal throw of any portion thereof.

In Fig. 3 I have shown a further modified take up device consisting of a series of spring tensioned flexible elements connected across the cords of equal arcs of one of the circular side pieces —2— and in this instance forming an isosceles triangle, each side of which consists of a flexible cable consisting in this instance of a spring —10— and chain —11— and an intermediate weighted member —12—, the ends of each cord member being attached at uniform distances apart to one of the circular side pieces. In this instance the springs —10— serve to maintain a normal tension upon the circular side pieces to take up part of the slack while the wheel is at rest or under slow motion which effect is increased under the speed of revolution of the wheel by the centrifugal action of the weights —12— which are thrown outwardly from a direct line between the points of attachment of each side piece or cord thereby exerting additional tension upon the springs —10— and introducing a resistance to the centrifugal throw of the cross pieces —3— of the grip tread proportionate to the speed of the wheel. In each of these take up devices shown in Figs. 1, 2 and 3 the entire grip tread including its take up device is loosely applied to the wheel and it is, therefore, free to shift or creep circumferentially relatively to the tire but the broad idea of my invention is to provide any yielding means which will automatically take up the slack and prevent excessive centrifugal throw of the gripping elements so that they will not strike or interfere with other parts of the machine, when the latter is driven at a high speed.

It is clear that many other devices may be employed to carry out the main object of my invention and I do not wish to limit myself to either of the structures shown and described.

In Fig. 5 I have shown a further modified form of take up device as applied to one of the circular side pieces, the latter having two comparatively long links —20— slidable one upon the other and surrounded by a coil spring —21— having its ends attached to the circular side pieces at opposite ends of the long links —20—, the spring —21— being tensioned to contract the circular side pieces which produces a sliding action of the long links —20— one upon the other and thereby reducing the diameter of said circular side pieces to draw the cross pieces into engagement with the periphery of the tire.

What I claim is:

1. In combination with a chain tire grip embodying cross chains, and side members to which the ends of the cross chains are connected, a take-up attachment surrounding the hub and embodying both flexible-yielding parts and flexible-unyielding parts connected together, and some of said parts being connected with one of the side members of the chain grip.

2. In combination with a tire grip having side members, a take-up attachment surrounding the hub and free from connection therewith, said take-up embodying a plurality of individual chain and spring members connected together with some of said members connected to one of the side members of the tire grip.

3. An anti-skidding attachment for wheels, comprising a plurality of cross chains, flexible attaching elements on opposite sides of the wheel to which the ends of said cross chains are connected, and a flexible tensioning member extending across a chord of said attaching elements with its ends attached to one of said elements, said flexible tensioning member being free from connection with the wheel to which the attachment is applied.

4. In combination with a tire grip having side members, a take-up attachment surrounding the hub and free from connection therewith, said take-up embodying a member, and a plurality of spring members connected at one end at intervals to said member and at their other ends at spaced intervals to one of said side members.

In witness whereof I have hereunto set my hand this 26th day of August 1907.

HARRY D. WEED.

Witnesses:
H. E. CHASE,
MILDRED M. NOTT.